United States Patent
Sugawara

Patent Number: 5,638,360
Date of Patent: Jun. 10, 1997

[54] METHOD AND APPARATUS FOR MEASURING ATM CELL RATE

[75] Inventor: Tsugio Sugawara, Tokyo, Japan

[73] Assignee: NEC Corporation, Tokyo, Japan

[21] Appl. No.: 461,424

[22] Filed: Jun. 5, 1995

[30] Foreign Application Priority Data

Jul. 15, 1994 [JP] Japan .................................. 6-164076

[51] Int. Cl.$^6$ ........................................................... H04J 3/14
[52] U.S. Cl. ........................................................... 370/253
[58] Field of Search ........................... 370/17, 84, 60, 370/94.1, 79, 61, 95.1

[56] References Cited

U.S. PATENT DOCUMENTS

| | | | |
|---|---|---|---|
| 5,163,046 | 11/1992 | Hahne et al. | 370/60 |
| 5,179,556 | 1/1993 | Turner | 370/94.1 |
| 5,343,465 | 8/1994 | Khalil | 370/17 |
| 5,400,329 | 3/1995 | Tokura et al. | 370/60 |
| 5,400,336 | 3/1995 | Boyer et al. | 370/60 |

*Primary Examiner*—Douglas W. Olms
*Assistant Examiner*—Shick Hom
*Attorney, Agent, or Firm*—Foley & Lardner

[57] ABSTRACT

Header information of a cell received by a cell reception buffer is converted into a numerical value, which is then stored in a header information memory. Simultaneously, the content of a writing pointer is added successively to the contents of the window size registers of a window size register group by an adder whose output data are used as reading data to read header information of cells corresponding to terminal ends of sliding windows from the header information memory. The contents of cell counters corresponding to the read cells are decremented by 1 only if the read header information is not equal to the header information of the received cell and if their window sizes coincide with each other. The content of a cell counter corresponding to the received cell is incremented by 1 only if the read header information is not equal to the header information of the received cell.

4 Claims, 4 Drawing Sheets

METHOD AND APPARATUS FOR MEASURING ATM CELL RATE

BACKGROUND OF THE INVENTION

1. Field of the Invention

The present invention relates to a method of and an apparatus for measuring cell rates at ATM (Asynchronous Transfer Mode) switching systems and subscribers to ATM-LANs or the like, and more particularly to a method of and an apparatus for measuring peak rates of received cells.

2. Description of the Prior Art

Heretofore, cell rate measuring apparatus have measured all cell rates on lines with a single sliding window using the FIFO principle or the like.

FIG. 1 of the accompanying drawings shows the manner in which cell rates are measured by a conventional sliding window system which employs a single sliding window. In FIG. 1, a window size is of five cells. As shown in FIG. 1, the sliding window system counts cells that are contained in a window having a certain cell time length which includes all the cells that have been received thus far. The window itself slides as cells are received.

FIG. 2 of the accompanying drawings shows two different window sizes, the window size for effective cells 1 being of a 5-cell time and the window size for effective cells 2 being of a 10-cell time. As shown in FIG. 2, the starting ends of the windows are always aligned with each other, and only the terminal end of each of the windows differs depending on the window size. Since cells to be counted in windows are associated with the respective window sizes, it is necessary not to count the same cell twice in different windows.

It has been difficult for the conventional cell rate measuring apparatus to measure cell rates of various users which have various peak rates and rate distributions because there is only one sliding window width. It has been economically and technically problematic to install a plurality of measuring circuits for a plurality of sliding windows.

SUMMARY OF THE INVENTION

It is an object of the present invention to provide a method of and an apparatus for measuring ATM cell rates simultaneously with a plurality of sliding windows using a single circuit.

To achieve the above object, there is provided in accordance with the present invention a method of measuring an ATM cell rate according to a sliding window system having a plurality of window sizes, comprising the steps of temporarily storing header information of a cell when the cell is received, simultaneously reading all header information corresponding to terminal ends of a plurality of sliding windows from the temporarily stored header information, comparing each of the read header information with the header information of the received cell, decrementing, by 1, each cell counter corresponding to a cell read from the temporarily stored header information if the read header information and the header information of the received cell are not equal to each other and if window sizes thereof agree with each other, and incrementing, by 1, a cell counter corresponding to the received cell if all the header information read from the temporarily stored header information is not equal to the header information of the received cell.

According to the present invention, there is also provided an apparatus for measuring an ATM cell rate according to a sliding window system having a plurality of window sizes, comprising a cell reception buffer for temporarily storing header information of a cell when the cell is received, a count table composed of size values of windows determined with respect to respective cells and values of cell counters, the size values and the values of cell counters being set to zero before cells start being received, header information memory means for storing converted values of all header information which has been received in a given period of time, converting means for converting a cell header inputted from the cell reception buffer into a corresponding value among a succession of numerical values and outputting the corresponding value each time a cell is received, a writing pointer for monitoring output data from the converting means, updating its own content by one header information, and simultaneously storing the output data from the converting means in the head information memory means at an address indicated by the writing pointer, a window size register group for storing window sizes of sliding windows, adding means for adding output data from the writing pointer successively to output data from registers of the window size register group and outputting all reading addresses indicative of terminal ends of a plurality of sliding windows for successively reading the header information from the header information memory means, a header information comparator for comparing the header information read from the header information memory means with the output data from the converting means, window size comparing means for successively comparing the output data from the registers of the window size register group with a window size value which has been read from the count table using the header information from the header information memory means as an address, means for decrementing, by 1, the content of a cell counter in the count table corresponding to the header information from the header information memory means if the output data from the header information comparator represents inconformity between the compared information and data and the output data from the window size comparing means represents conformity between the compared data and value, and means for reading the count table using the output data from the converting means as an address and incrementing, by 1, the content of a cell counter corresponding to the received cell if the output data from the header information comparing means represents inconformity between the compared information and data with respect to all the registers of the window size register group.

Generally, simultaneous measurement of cell rates with a plurality of sliding windows requires as many temporary memories (header information memories) as the number of the types of the sliding windows. This is because sliding windows need to be regarded as a type of FIFO configuration. If all outlets of FIFO configurations having a common inlet and different lengths are to be monitored at all times, then it is necessary to arrange as many FIFO configurations as the number of the outlets.

According to the present invention, a single temporary memory (header information memory) is used in combination with a converter, a count table, a writing pointer, a window size register group, an adder, a header information comparator, a window size comparator, etc. for measuring cell speeds (values of cell counters). Therefore, it is possible to simultaneously measure cell rates with a plurality of sliding windows using a single circuit.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
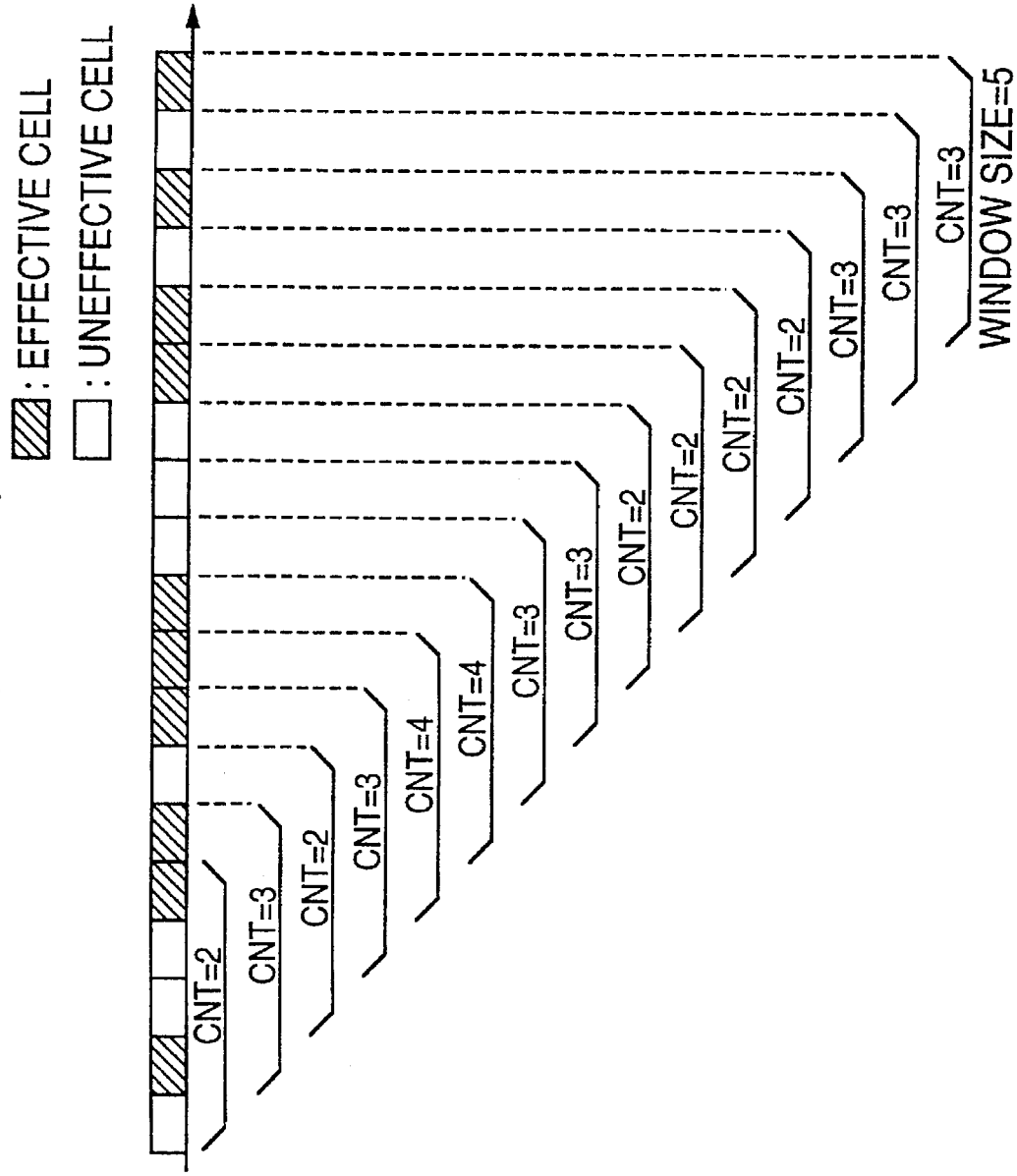
FIG. 1 is a diagram illustrative of a conventional method of measuring cell rates with a single sliding window.
Figure 2:
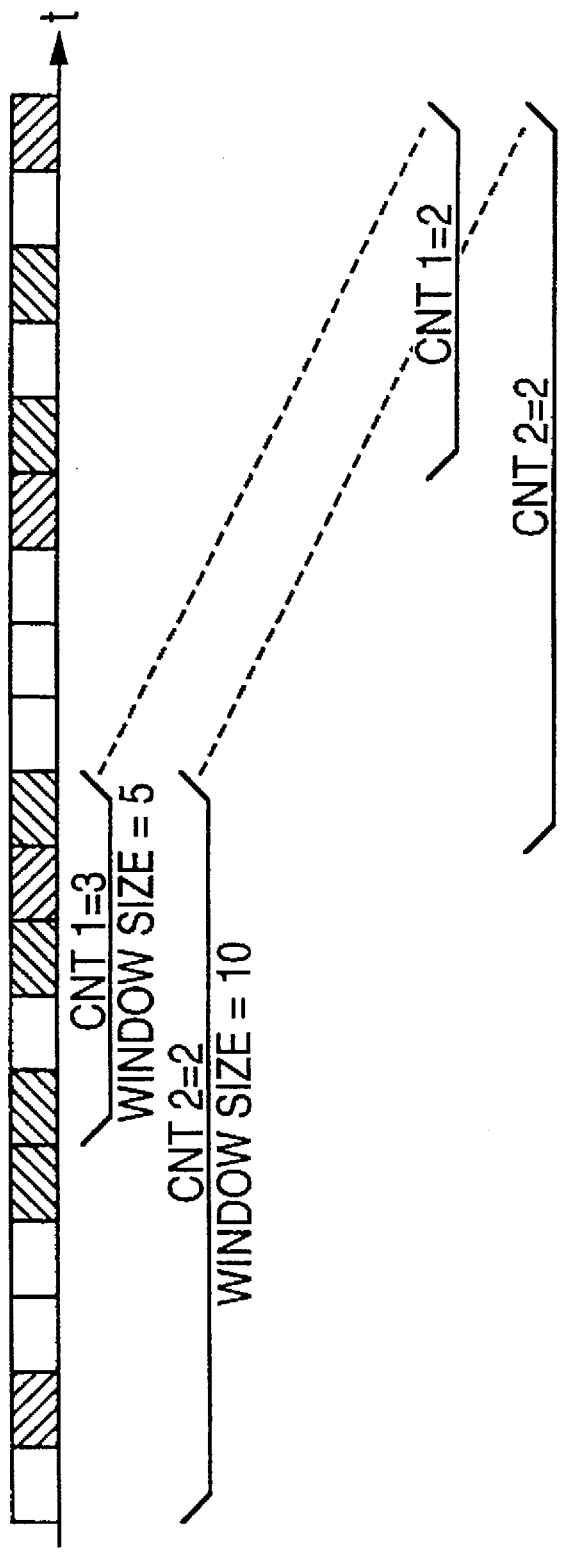
FIG. 2 is a diagram illustrative of a conventional method of measuring cell rates with a plurality of sliding windows.
Figure 3:
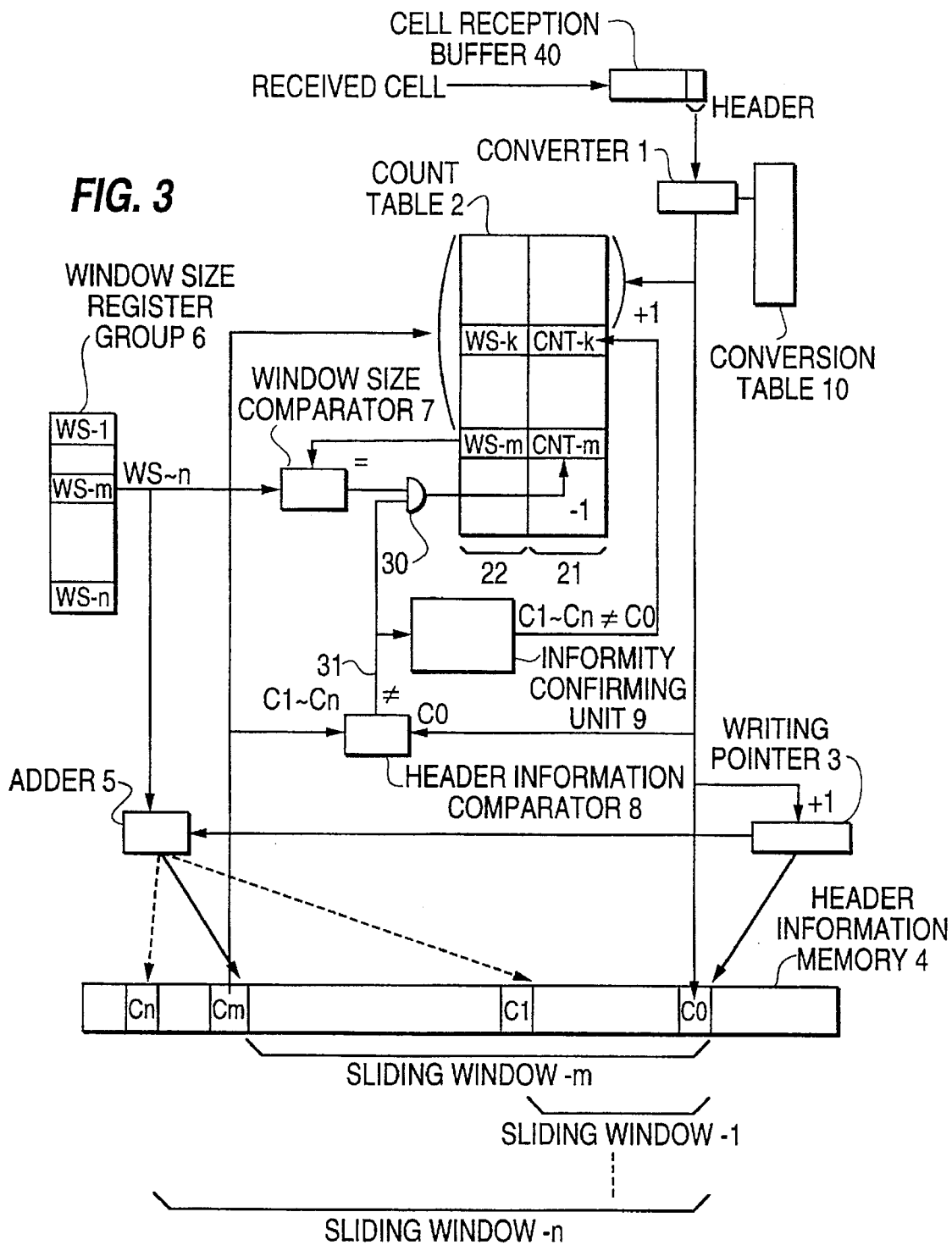
FIG. 3 is a block diagram of an apparatus for measuring ATM cell rates according to an embodiment of the present invention.

As shown in FIG. 3, an apparatus for measuring ATM cell rates according to an embodiment of the present invention generally comprises a converter 1, a count table 2, a writing pointer 3, a header information memory 4, an adder 5, a window size register group 6, a window size comparator 7, a header information comparator 8, an inconformity confirming unit 9, a conversion table 10, an AND gate 30, and a cell reception buffer 40.

The cell reception buffer 40 stores a cell that has presently been received, and outputs only its header to the converter 1. Referring to the conversion table 10, the converter 1 converts the cell header into a numerical value C0 corresponding to the header information of the received cell, among a succession of integers that are determined in association with header information of cells, and outputs the numerical value C0. The writing pointer 3 monitors the output data from the converter 1, updates, by itself, the content of the writing pointer 3 by one header information, and stores the output data from the converter 1 in the header information memory 4 at an address indicated by the writing pointer 3 itself. The output data from the converter 1 is also inputted to the count table 2 and the header information comparator 8 for subsequent use. The address output from the writing pointer 3 is applied to the adder 5, which adds the address output successively to respective output data from the registers of the window size register group 6. The adder 5 outputs all reading addresses successively to read information indicative of the terminal ends of a plurality of sliding windows successively from the header information memory 4. FIG. 3 illustrates a state in which the reading address from the adder 5 reaches a sliding window "m" and information Cm corresponding to the terminal end of the sliding window "m" is read from the header information memory 4. The information read from the header information memory 4 is outputted to the header information comparator 8 and the count table 2. The header information comparator 8 compares the information from the header information memory 4 with the output data from the converter 1, and outputs a signal 31 indicating that they are not in agreement with each other. The signal 31 is supplied to the AND gate 30 and the inconformity confirming unit 9.

The output data from the registers of the window size register group 6 are also successively supplied to the window size comparator 7 as well as the adder 5. The window size comparator 7 compares the supplied output data with a window size value 22 which has been read from the count table 2 using the information read from the header information memory 4 as a reading address. Only when the compared window Sizes coincide with each other, the AND gate 30 ANDs an output signal from the window size comparator 7 and the signal 31 from the header information comparator 8. If the result of the ANDing operation of the AND gate 30 is true, then it is assumed that the cells in the window have been reduced by one, and the AND gate 30 outputs a signal to decrement, by 1, the content of a cell counter 21 which corresponds to the information outputted from the header information memory 4. The inconformity confirming unit 9 monitors the signal 31 while the above operation is being repeated with respect to all the registers of the window size register group 6. If the signal 31 is true with respect to all the registers, then since the received cell and all the information read from the header information memory 4 are not in agreement with each other, it is assumed that the cells in the window have been increased by one, and the content of the count table 2 is read using the output data from the converter 1 as an address, and the content of the cell counter 21 corresponding to the received cell is incremented by 1.

Before starting to receive cells, the window size value 22 in the count table 2 is set to a window size determined with respect to each cell, and at the same time the cell counter 21 is set to zero indicating an initial state. Similarly, the registers of the window size register group 6 are initially set to respective window sizes in terms of cells, and the content of the header information memory 4 is initially made invalid.

Figure 4:
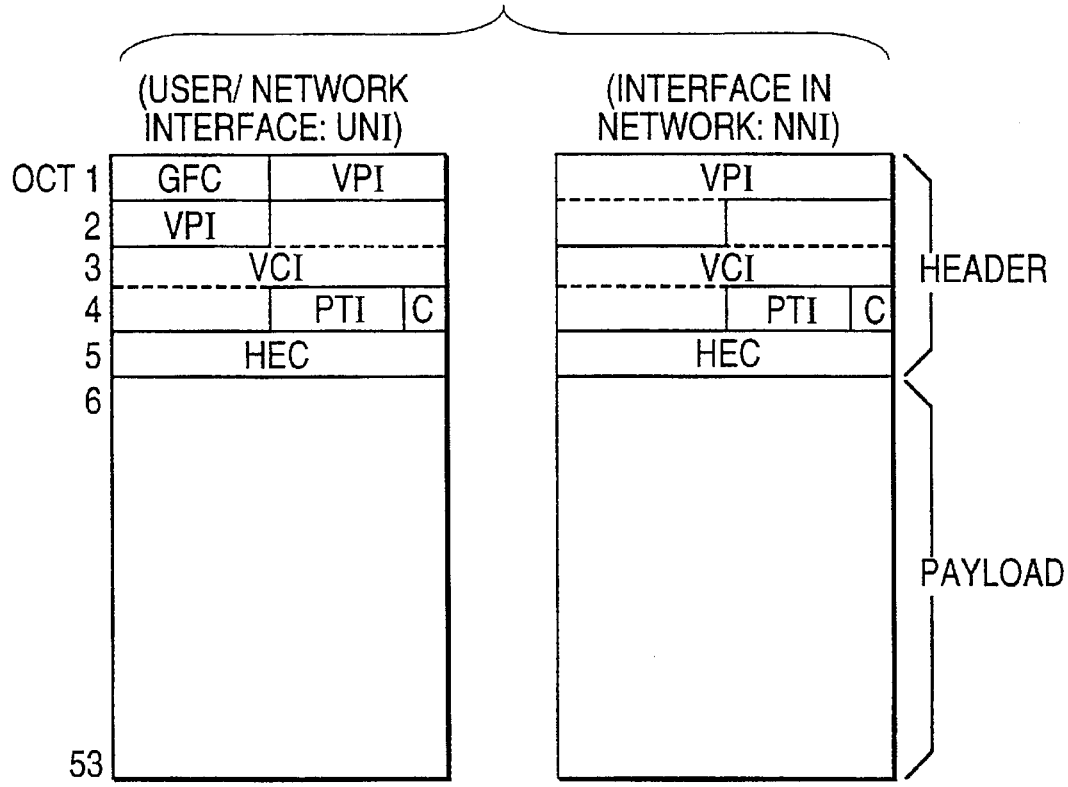
FIG. 4 is a diagram showing the formats of ATM cells that are received by the apparatus for measuring ATM cell rates shown in FIG. 3.

FIG. 4 shows the formats of ATM cells received by the apparatus for measuring ATM cell rates shown in FIG. 3. In FIG. 4, GFC represents Generic Flow Control, VPI Virtual Path Identifier, VCI Virtual Channel Identifier, PTI Payload Type Identifier, C Cell Loss Priority, and HEC Header Error Control.

Figure 5:
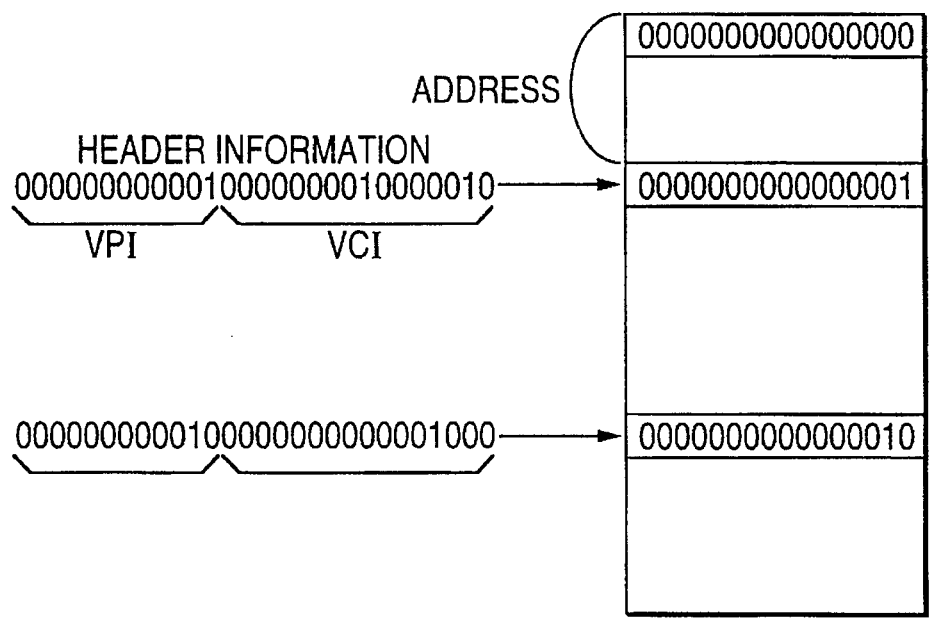
FIG. 5 is a diagram showing the manner in which data are converted by a converter using a conversion table in the apparatus for measuring ATM cell rates shown in FIG. 3.

FIG. 5 illustrates the manner in which data are converted by the converter 1 using the conversion table 10. In the apparatus according to the illustrated embodiment, the VPI of 12 bits and the VCI of 16 bits are used as header information, and the header information is used as a reading address for the conversion table 10. Data read from the conversion table 10 is then converted so as to correspond to one of the numerical values.

Although a certain preferred embodiment of the present invention has been shown and described in detail, it should be understood that various changes and modifications may be made therein without departing from the scope of the appended claims.

What is claimed is:

1. A method of measuring an ATM cell rate according to a system having a plurality of sliding windows, comprising the steps of:

temporarily storing header information of a cell when the cell is received;

simultaneously reading all header information corresponding to terminal ends of said plurality of sliding windows each having a fixed length of window size from the temporarily stored header information;

comparing each of the read header information with the header information of the received cell;

decrementing, by 1, each cell counter corresponding to a cell read from the temporarily stored header information if the read header information and the header information of the received cell are not equal to each other and if the window size in each cell counter corresponding to each header information read from said temporarily stored header information agrees with the window size corresponding to each header information read from said temporarily stored header information; and incrementing, by 1, a cell counter corresponding the received cell if all the header information read from the temporarily stored header information is not equal to the header information of the received cell.

2. A method according to claim 1, wherein the header information of the received cell is converted into a numerical value corresponding to the header information of the received cell, among a succession of integers that are determined in association with header information of cells, and the numerical value is stored.

3. An apparatus for measuring an ATM cell rate according to a system having a plurality of sliding windows, comprising:

a cell reception buffer for temporarily storing header information of a cell when the cell is received;

a count table composed of size values of windows determined with respect to respective cells and values of cell counters, said size values and said values of cell counters being set to zero before cells start being received;

header information memory means for storing converted values of all header information which has been received in a given period of time;

converting means for converting a cell header inputted from said cell reception buffer into a corresponding value among a succession of numerical values and outputting the corresponding value each time a cell is received;

a writing pointer for monitoring output data from said converting means, updating its own content by one header information, and simultaneously storing the output data from said converting means in said header information memory means at an address indicated by the writing pointer;

a window size register group for storing window sizes of sliding windows;

adding means for adding output data from said writing pointer successively to output data from registers of said window size register group and outputting all reading addresses indicative of terminal ends of said plurality of sliding windows each having a fixed length of window size for successively reading the header information from said header information memory means;

a header information comparator for comparing the header information read from said header information memory means with the output data from said converting means;

window size comparing means for successively comparing the output data from the registers of said window size register group with a window size value which has been read from said count table using the header information from said header information memory means as an address;

means for decrementing, by 1, the content of a cell counter in the count table corresponding to the header information from said header information memory means if the output data from said header information comparator represents inconformity between the compared information and data and the output data from said window size comparing means represents conformity between the compared data and value; and means for reading said count table using the output data from said converting means as an address and incrementing, by 1, the content of a cell counter corresponding to the received cell if the output data from said header information comparing means represents inconformity between the compared information and data with respect to all the registers of said window size register group.

4. A method according to claim 1, wherein the step of temporarily storing header information of a cell includes the steps of:

converting the header information of the received cell into an integer value; and storing the integer value corresponding to the header information of the received cell.

* * * * *